UNITED STATES PATENT OFFICE.

WALTER JAMES BROWNING, OF HUELVA, SPAIN.

PROCESS FOR THE PRODUCTION OF HYDROGEN SULPHIDE FROM SULPHUROUS GASES.

1,407,323. Specification of Letters Patent. Patented Feb. 21, 1922.

No Drawing. Application filed November 12, 1919. Serial No. 337,585.

*To all whom it may concern:*

Be it known that I, WALTER JAMES BROWNING, a subject of the King of the United Kingdom of Great Britain and Ireland, and residing at Huelva, Spain, have invented a certain new and useful Improvement in Processes for the Production of Hydrogen Sulphide from Sulphurous Gases, of which the following is a specification.

This process relates to an improved industrial process for obtaining hydrogen sulphide from sulphurous gases produced by the burning, combustion, calcination or distillation of all classes of sulphurous materials, for example, from gases produced by the calcination of pyrites and mattes in roasting furnaces, gases produced by the treatment of blendes and gases produced by smelting sulphurous ores and materials.

The improved process consists in converting the sulphur dioxide and sulphur trioxide into hydrogen sulphide by passing the sulphurous gases continuously through a carbonaceous zone maintained incandescent exclusively by the combustion of the carbonaceous matter in the presence of free oxygen contained in and added to the gases, the supply of added oxygen being regulated so as to maintain the incandescent zone at the requisite temperature, whereby to effect continuously the reduction of the sulphur dioxide and to produce continuously hydrogen sulphide by the inter-reaction of the sulphur content with the hydrogen content of the moisture normally present in the sulphurous gases treated or by inter-reaction with the hydrogen content of the carbonaceous matter used or by inter-reaction with the hydrogen content of water vapour added to the gases before their passage into the incandescent zone or by combinations of these.

The reduction of the gases and the production of hydrogen sulphide is carried out continuously by aid of the heat generated by the combustion of the carbon with the free oxygen and the oxygen of the sulphur dioxide and sulphur trioxide of the gases treated, the requisite temperature of the carbonaceous zone being maintained, if necessary, by reducing the sulphur dioxide or trioxide content of the gases by dilution with air in such proportions as will ensure the maintenance of the requisite temperature of the carbonaceous matter by its combustion with the oxygen of the air and the oxygen in combination with sulphur in the sulphurous gases.

I am aware that it has been previously proposed inter alia to pass sulphurous gases together with producer gas and steam into a kiln containing incandescent coke whereby to obtain hydrogen sulphide, but such processes have been intermittent and it has been necessary periodically to interrupt the passage of the sulphurous gases and blow air through the incandescent zone to maintain it at the required temperature.

I claim:—

1. A process for continuously obtaining hydrogen sulphide from sulphurous gases consisting in passing the gases diluted with air through an incandescent carbonaceous zone in the presence of hydrogen to effect reduction of oxide of sulphur present in the gases by means of the incandescent carbon and to produce hydrogen sulphide by the inter-reaction with the hydrogen of the sulphur obtained by reduction.

2. An industrial process for obtaining hydrogen sulphide from sulphurous gases produced by the combustion, calcination or distillation of sulphurous materials consisting in passing the gases in the presence of hydrogen continuously through a carbonaceous zone maintained incandescent exclusively by the combustion of carbonaceous matter, in the presence of oxygen contained in and added to the gases, while regulating the supply of oxygen so as to maintain the incandescent zone at the requisite temperature to effect continuously reduction of the sulphur dioxide and to produce continuously hydrogen sulphide by the inter-reaction of the sulphur content with the hydrogen present.

3. An industrial process for obtaining hydrogen sulphide from moisture carrying sulphurous gases produced by the combustion, calcination or distillation of sulphurous materials consisting in passing the gases continuously through a carbonaceous zone maintained incandescent exclusively by the combustion of carbonaceous matter in the presence of oxygen contained in and added to the gases, while regulating the supply of oxygen so as to maintain the incandescent zone at the requisite temperature to effect continuously reduction of the sulphur dioxide and to produce continuously hydrogen sulphide by the inter-reaction of the sulphur content with the hydrogen content of the moisture carried by the gases.

4. An industrial process for obtaining hydrogen sulphide from moisture carrying sulphurous gases produced by the combustion, calcination or distillation of sulphurous materials consisting in passing the gases continuously through a carbonaceous zone maintained incandescent exclusively by the combustion of carbonaceous matter in the presence of oxygen contained in and added to the gases, while regulating the supply of oxygen so as to maintain the incandescent zone at the requisite temperature to effect continuously reduction of the sulphur dioxide and to produce continuously hydrogen sulphide by the inter-reaction of the sulphur content with the hydrogen content of the moisture carried by the gases and the hydrogen content of the carbonaceous matter used.

In testimony whereof I have signed my name to this specification in the presence of two subscribing witnesses.

WALTER JAMES BROWNING.

Witnesses:
W. PORTERN,
U. G. HUTCHISON.